United States Patent [19]

Siewert et al.

[11] 4,276,109
[45] Jun. 30, 1981

[54] PROCESS FOR HIGH FREQUENCY HEAT SEALING OF TEXTILE SHEET MEMBERS

[76] Inventors: Ingo Siewert, Schmidstr. 11, 102 Berlin; Manfred Klaue, Frankenstr. 11, 1114 Berlin; Peter Thietz, Baenschstr. 69, 1035 Berlin, all of German Democratic Rep.

[21] Appl. No.: 110,386

[22] Filed: Jan. 7, 1980

Related U.S. Application Data

[63] Continuation of Ser. No. 878,920, Feb. 17, 1978, abandoned.

[30] Foreign Application Priority Data

Feb. 21, 1977 [DD] German Democratic Rep. ... 197508

[51] Int. Cl.³ ............................................. B29C 27/04
[52] U.S. Cl. .................................... 156/273; 156/148; 156/296; 156/308.4; 156/321; 219/10.53
[58] Field of Search ............... 156/273, 272, 274, 148, 156/290, 62.6, 321, 308.4, 296; 219/10.53

[56] References Cited

U.S. PATENT DOCUMENTS

| | | | |
|---|---|---|---|
| 2,987,101 | 6/1961 | Luker | 156/273 |
| 3,336,173 | 8/1967 | Renfroe | 156/273 |
| 3,574,031 | 4/1971 | Heller, Jr. et al. | 156/273 |
| 3,741,845 | 6/1973 | Castagna | 156/273 |

*Primary Examiner*—Michael G. Wityshyn
*Attorney, Agent, or Firm*—Michael J. Striker

[57] ABSTRACT

Process for forming seams in textile structures free of individually high frequency heat sealable components. Textile structure is subjected to a high frequency current to produce seams. Structure contains first fiber component that does not become thermoplastic within the field, but becomes heated. A second fiber component becomes thermoplastic from heat generated in the first component. First component may be polyacrylonitrile; second may be polyester, texturized polyester silk or polypropylene. A third component may be added for reinforcement and fluffiness.

8 Claims, No Drawings

PROCESS FOR HIGH FREQUENCY HEAT SEALING OF TEXTILE SHEET MEMBERS

This is a continuation of application Ser. No. 878,920, filed Feb. 17, 1978, now abandoned.

FIELD OF USE OF THE INVENTION

The invention relates to a process for the high frequency heat sealing of textile sheet structures consisting of components of materials which are not heat sealable by themselves, particularly in the production of garment articles.

CHARACTERISTICS OF THE KNOWN TECHNICAL SOLUTIONS

It is generally known to employ synthetic materials which are HF-heat sealable for joining sheet structures by HF-heat sealing. If mixtures of materials are used either all individual components of the materials are themselves HF-heat sealable or the heat sealability is based on a predominant share of a heat sealable component while the other non-heat sealable material components have only some kind of a filler effect. For materials which are only inadequately or not at all HF-heat sealable it is known to use various heat sealing additives. For this purpose compound foils, for instance of PVC and PVAL have been described. In the thus formed compound material the foil, however, forms an impenetrable blocking layer which, because of hygiene conditions, makes the wearing of garments impossible if the materials are used in the garment industry.

A spraying of organic solutions or of dispersions of these compounds has the disadvantage of a nonuniform deposit. Besides, the expense of this procedure is too high to be accepted.

Frequently this spraying technique results in an undesirable stiffening of the thus pretreated surface zone.

It is also known to employ pulverulent heat sealing adjuncts consisting of metals or metal oxides and to apply them by powdering the surface or to apply them to the surface of the material by rolling.

In other technological solutions to the problem these additives are mixed with a thermoplastic powder and are then applied by sintering.

The use has also already been described of ferromagnetic cement or putty materials.

All these known solutions have the basic shortcoming that in order to form a heat sealable sheet structure there must always be present a portion of an HF-heat sealable material and that otherwise heat sealing additives must be employed. Apart from the listed shortcomings this implies an additional material requirement which is connected with an increased technical and labor expense. These shortcomings have also prevented employing HF-heat sealing of seam connections on a larger scale in the garment industry.

OBJECT OF THE INVENTION

The object of the invention is to provide for a process for making textile sheet materials which consist of non-HF-heat sealable components, which do not require additional additives or process steps, and which result in a high quality of the sealing seams and of good wear properties of the garments made thereby.

DISCUSSION OF THE ESSENCE OF THE INVENTION

The invention has the object to provide for a process by which a textile sheet structure can be formed from components which are by themselves not HF-heat sealable under the conditions of the normal production and without use of additional heat sealing additive. This object is accomplished by a two component composition of the textile surface structure of which one component (A) is subject to being heated and the other (B) becomes thermoplastic under the action of the H-F field.

Thus the heat sealing of textile surface structures can be accomplished if the material is composed of components which, by themselves, are not HF-heat sealable, but which, in case of HF exposure, have the indicated interrelated effect on each other so that an internal heating of one and a plasticizing of the other material and thereby a heat sealing effect occurs. All this is accomplished without affecting the textile qualities and wear properties of the heat sealed product.

A futher component (C) may be added in order to prevent an overly flat rigidified or compact sealing zone but rather cause a fluffier structure to form. In addition this component also serves as a reinforcement of the seam. However, this third component likewise is not adapted to be subjected to high frequency sealing by itself.

As materials the following are particularly suitable:
Component A: polyacrylonitrile fibers;
Component B: polyester fibers, polypropylene fibers;
Component C: viscose rayon fibers, cotton fibers.

The result of good textile properties, for instance in the form of a wool-like character is the result of the mixture of the components. The components A and B have a mutual intereffect in the HF-field causing an internal heating and plasticizing to occur and a heat sealing to result.

When using the three-component system the following range should be observed.
Component A: 10–70%
Component B: 15–80%
Component C: 10–65%

It will be understood that a heat sealable component may be admixed to these mixtures of textile materials in a proportion that would not affect the results of the invention, i.e., that by itself would not permit high frequency heat sealing.

The solution of the invention makes unnecessary any additional effort during the production when applying HF-heat sealing since these textile heat materials are made HF-heat sealable themselves by their composition. The HF-heat sealing technology which is highly productive from the labor point of view can thus be used to join seams in the garment industry when making, for instance, men's suits or trousers.

EXAMPLES

The invention will be explained further by the following embodiments.

EXAMPLE 1

A textile is used consisting of a homogeneous fiber mixture, consisting of
33⅓% polypropylene fibers,
33⅓% polyacrylonitrile fibers, and
33⅓% vicose rayon fibers.

The textile has a surface mass of 160 g/m².

This material is cut for making children's pants. The crotch and side panel seams of the pants are heat sealed in an HF-heat sealing press.

EXAMPLE 2

For producing pullover garments a knitted web is used made of three threads. These threads may be of equal strength and may be combined so that the following ratio in the mixture is obtained:

45% polyester silk, texturized
33% polyacryoniltrile fiber
20% cotton.

The cut-to-size parts are placed into an HF-heat sealing process and in known manner the side panel shoulder, sleeve seams and selvages are heat sealed.

We claim:

1. A process of forming seams in textile structures which are substantially free of components that are individually high frequency heat sealable comprising subjecting to a high frequency current a textile structure containing a first component in the form of fibers which are subject to being heated upon exposure to a high frequency filed but which do not become thermoplastic upon such exposure, and a second component in the form of fibers which are subject to becoming thermoplastic upon exposure of the textile structure to a high frequency field and which becomes thermoplastic from heat generated in said first component, thereby producing one or more seams in said textile structure.

2. The process of claim 1 wherein said first component of fibers consists essentially of polyacrylonitrile fibers and said second component of fibers consists essentially of polyester, texturized polyester silk or polypropylene fibers.

3. The process of claim 1 wherein the textile structure contains a third component in the form of fibers added for reinforcement and fluffiness, said third component likewise not individually high frequency heat sealable, whereby formation of an overly flat, rigidified or compact sealing zone is avoided.

4. The process of claim 3 wherein said third component consists essentially of viscose rayon or cotton fibers.

5. The process of claim 3 wherein each of the three components is present in an amount of about one-third of the total fibers.

6. The process of claim 3 wherein said first component comprises about 10 to 70%, said second component comprises about 15 to 80%, and said third component comprises about 10 to 65% of the total fibers.

7. The process of claim 1 further comprising combining said components into thread or yarn prior to forming the textile structure which is then subjected to the high frequency current.

8. The process of claim 1 wherein threads of the individual components are interwoven or otherwise combined in forming the textile structure which is then subjected to the high frequency current.

* * * * *